(No Model.)

P. A. COUPAL.
MACHINE FOR MAKING AND DRIVING STAPLES.

No. 575,296.  Patented Jan. 12, 1897.

Fig. 1.

WITNESSES:
INVENTOR:

(No Model.)  8 Sheets—Sheet 2.

P. A. COUPAL.
MACHINE FOR MAKING AND DRIVING STAPLES.

No. 575,296. Patented Jan. 12, 1897.

FIG. 2.

WITNESSES:
A. D. Harrison
P. W. Pezzetti

INVENTOR:
P. A. Coupal
by Wright Brown & Quinby
Attys (No Model.) 8 Sheets—Sheet 4.

P. A. COUPAL.
MACHINE FOR MAKING AND DRIVING STAPLES.

No. 575,296. Patented Jan. 12, 1897.

WITNESSES:
A. D. Harrison
J. W. Griffith

INVENTOR:
P. A. Coupal
by Wright Brown & Quinby
Attys.

(No Model.) 8 Sheets—Sheet 5.

P. A. COUPAL.
MACHINE FOR MAKING AND DRIVING STAPLES.

No. 575,296. Patented Jan. 12, 1897.

WITNESSES:
A. D. Harrison.
J. W. Pizzetti.

INVENTOR:
P. A. Coupal
by Wright Brown & Quimby
attys.

(No Model.) 8 Sheets—Sheet 8.

P. A. COUPAL.
MACHINE FOR MAKING AND DRIVING STAPLES.

No. 575,296. Patented Jan. 12, 1897.

WITNESSES:
A. D. Harrison
P. W. Pizzetti

INVENTOR:
P. A. Coupal
by Knight Brown Quinby
attys

UNITED STATES PATENT OFFICE.

PETER A. COUPAL, OF BOSTON, MASSACHUSETTS, ASSIGNOR, BY DIRECT AND MESNE ASSIGNMENTS, TO THE GORDON STAPLE LASTING AND TACKING COMPANY, OF PORTLAND, MAINE.

MACHINE FOR MAKING AND DRIVING STAPLES.

SPECIFICATION forming part of Letters Patent No. 575,296, dated January 12, 1897.

Application filed May 21, 1896. Serial No. 592,431. (No model.)

*To all whom it may concern:*

Be it known that I, PETER A. COUPAL, of Boston, in the county of Suffolk and State of Massachusetts, have invented certain new and useful Improvements in Machines for Making and Driving Staples, of which the following is a specification.

This invention relates to machines for making metallic fasteners called "staples" and driving them so as to temporarily or permanently unite the different parts of a boot or shoe, particularly tacking the upper to the insole in lasting boots and shoes.

The object of this invention is to provide a machine wherein the operation of the making and driving mechanism shall be controlled by the placing of the work in position against a movable throat or work-rest and whereby the mechanism will be thrown out of operation when no work is in position to be operated upon.

A further object of the invention is to provide a durable and smoothly-running machine in which eccentrics or their equivalents shall replace the usual cams.

To these ends the invention consists in the construction and combination of parts substantially as hereinafter described and claimed.

Fig. 9 represents a similar view of the parts in the position when the driver is in its lower position. Fig. 19 represents a section on line 19 19 of Fig. 16, looking downward.

Similar reference-characters indicate the same parts throughout the several figures.

To facilitate an understanding of the following description of the mechanism, I will first describe the same briefly in connection with the most salient features of the mechanism.

Power is applied to the pulley $b'$, which is connected to the main shaft $b$ at intervals by means of a clutch operated by the pressure of work against the rest $p$ and through the levers $p'$ $p^6$, which throw a portion of the clutch into the path of movement of one of the pins $b^2$, carried by the pulley. After a single rotation of the shaft the pulley is automatically disconnected therefrom if the work has been removed from the work-rest.

Wire is drawn from the reel by means of feed-rolls $e^2$ $e^3$ and pushed between the anvil $d$ and a gripper. A length of wire is severed by means of a cutter to form a blank, which is taken by the anvil and gripper while in a retracted position and then advanced under the driver, which has been previously elevated and held by a latch $c^6$, after which the anvil recedes. The carrier $c^2$ descends until its throat is adjacent to the work-rest, when the latch is moved to release the spring-operated driver and the latter forces the staple, which has been bent by the lower end of the carrier $c^2$ over the anvil down through the throat and the work-rest. After this operation the driver-bar carrier elevates the driver-bar ready for another operation.

Referring now to Figs. 1, 2, 3, and 5, $a$ represents the supporting-frame, mounted upon a suitable base or standard $a^\times$, said supporting-frame being provided at its front with a fixed guide $a'$ for the driver-bar and below said guide $a'$ with another guide for the vertical movable driver-bar carrier, the said carrier forming a guide for the vertical movements of the driver and driver-bar.

$b$ represents the driving-shaft, mounted in the frame $a$ and provided with a loose driving-pulley $b'$, provided with pins $b^2$, which are adapted to engage the clutch mechanism hereinafter described.

$c$ represents the driver, secured in the lower end of the driver-bar $c'$. (See Figs. 5, 8, 9, and 10.) Said driver-bar and driver reciprocate vertically in the carrier $c^2$, said carrier being operated by means of the rod or pitman $c^3$, connecting it with a wrist-pin $c^4$, projecting from the wrist-plate $c^5$ at the front end of the shaft $b$. (See Figs. 1, 3, and 5.)

$c^6$ represents a latch pivoted at $c^7$ in an opening in the front or head of the frame and having an upper end face $c^8$, adapted to engage under a shoulder $c^9$, formed at the upper end of a slot in the driver-bar $c'$ and adapted to retain the driver-bar in an elevated position until the latch is operated to permit the bar to descend.

The face of the driver-bar is grooved, as indicated at $c^{11}$, above the shoulder $c^9$ and said slot to receive the latch when the latter has been displaced and the driver-bar is descending. The carrier $c^2$ is provided near its upper end with a cam-shaped striker $c^{10}$, which is adapted to engage the cam or inclined face $c^{13}$ of the latch $c^6$ when the carrier descends in order to move the upper end of the latch $c^6$ out from under the shoulder $c^9$ of the driver-bar. Near the lower end of the carrier is another striker or cam $c^{12}$, which is adapted, on the upward movement of the carrier, to engage with a cam or inclined face $c^{14}$ of the latch and move the lower end of the latch outward, so as to throw the upper end of the latch under the shoulder $c^9$ when the carrier ascends. The cams or strikers $c^{10}$ $c^{12}$ therefore automatically control the oscillating movements of the latch. The driver-bar is lifted by the engagement of its lower end with the bottom of the recess in the carrier, this position of contact being indicated in Fig. 8, in which figure the driver-bar and carrier are shown as in their elevated positions and the striker $c^{12}$ as having just moved the latch into position to engage the shoulder $c^9$. To continue the rotation of the main shaft causes the carrier to descend, through the connection of the wrist-pin and pitman above described, until the upper striker engages the end face $c^8$ of the latch and moves it to the position shown in Fig. 9, at which instant the driver is forced downward by means of the spring $c^{16}$ acting through the arm $c^{15}$ and the thrust-pin $c^{17}$.

In order to adjust the point to which the driver-bar may be moved by the spring-pressed arm, the upper end of the driver-bar is provided with a stop-nut $c^{18}$, fitted on its upper end and held in place by means of a suitable jam-nut. In a socket in the upper end of the head of the frame is a cushion $c^{19}$ to receive the blow of the stop-nut $c^{18}$. It will be seen that by means of this construction the force of the driver-depressing spring or springs is sustained by the latch during a considerable part of each rotation of the driver-shaft, instead of being sustained by the shaft during the greater part of each rotation, as has been the case in machines employing a lifting-cam. In my improved machine, therefore, the wear of the parts which impart upward motion from the driving-shaft to the driver-bar is considerably reduced, as compared with machines in which a pressure of the driver-bar spring is supported by the raising-cam until the driver-bar is released to give its blow.

Figures 5, 6, 7:
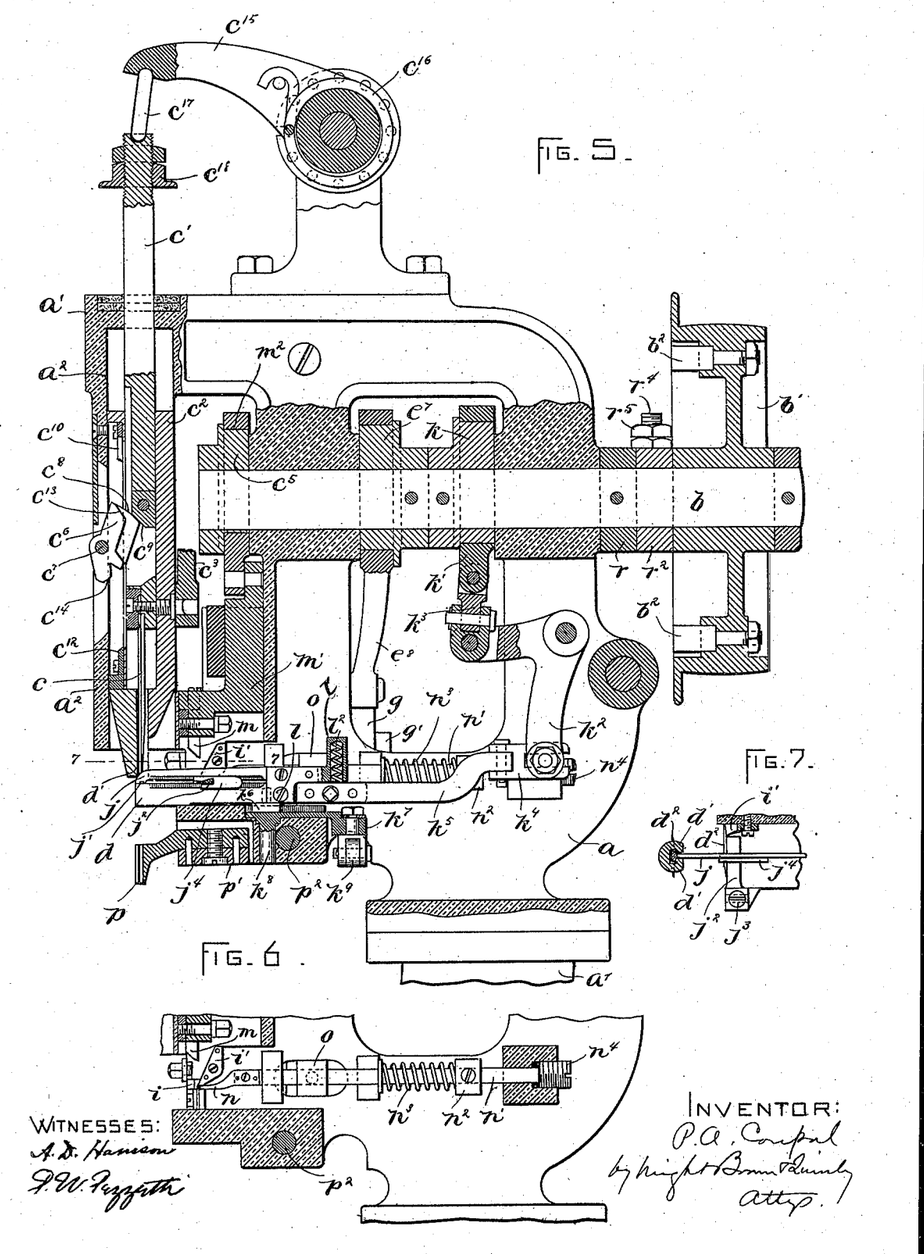
Fig. 5 represents a section on line 5 5 of Fig. 3, the clutch mechanism being omitted.
Fig. 6 represents a detail elevation of parts of the staple-forming mechanism.
Fig. 7 is a detail section on line 7 7 of Fig. 5.
Figure 7:
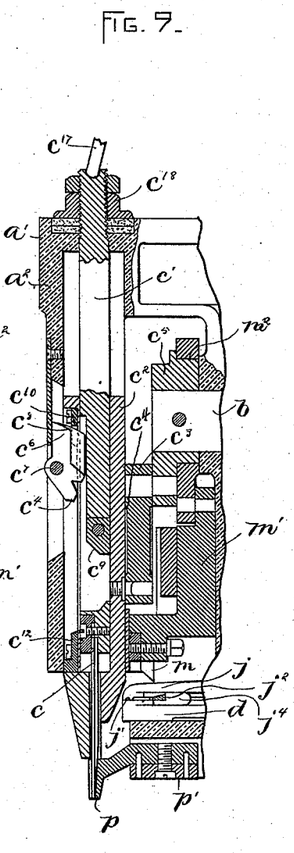
Figure 8:
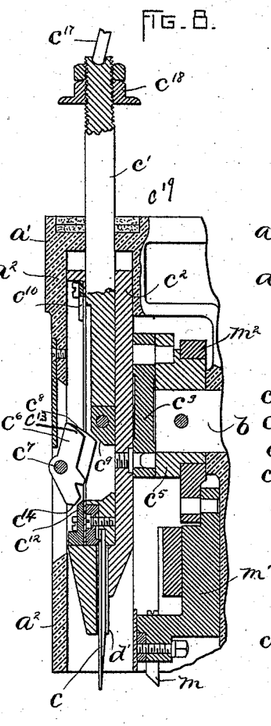
Fig. 8 represents a detail sectional view illustrating the driver and parts of its coacting mechanism, the driver being in a raised position.
Figure 10:
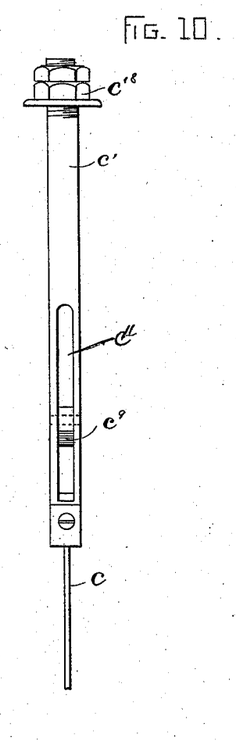
Fig. 10 represents a detail front elevation of the driver.

The carrier $c^2$ not only serves to raise the driver and operate the latch, as above described, but also to bend wire blanks over the anvil $d$ to form staples, the lower end of the carrier being slotted to form bending-jaws $d'$ $d'$, adapted to bend the end portions of the blank $d^2$, Fig. 7, over the anvil $d$.

Before describing the reciprocating movements of the anvil and its gripper to bring the blank into position under the carrier I will describe the mechanism for feeding the wire. The wire-supply roll $e$ is mounted on a suitable bracket or arm supported by the frame $a$, and the wire from said roll passes through a guide $e'$, carried by a fixed bracket at the lower end of the head of the frame.

$e^2$ $e^3$ represent feeding-rolls having serrated and milled peripheries, the upper roll $e^2$ being mounted on a shaft $e^4$, mounted in the said bracket on the head of the machine. On one side of the roll $e^2$ is a ratchet $e^5$, adapted to be operated by a pawl $e^9$, carried by the arm $e^6$, projecting from the sleeve $e^{14}$, loosely pivoted upon the shaft $e^4$ and operated by means of a pitman $e^8$, connected by means of an arm $e^{15}$ with said sleeve and connected with a strap fitted to the eccentric $e^7$ on the main shaft $b$. This is the form illustrated in Figs. 1, 2, 3, 11, and 12, and will be further described, although, as before stated, I prefer the construction illustrated in Figs. 15 and 17, which will be described later.

Figure 1:
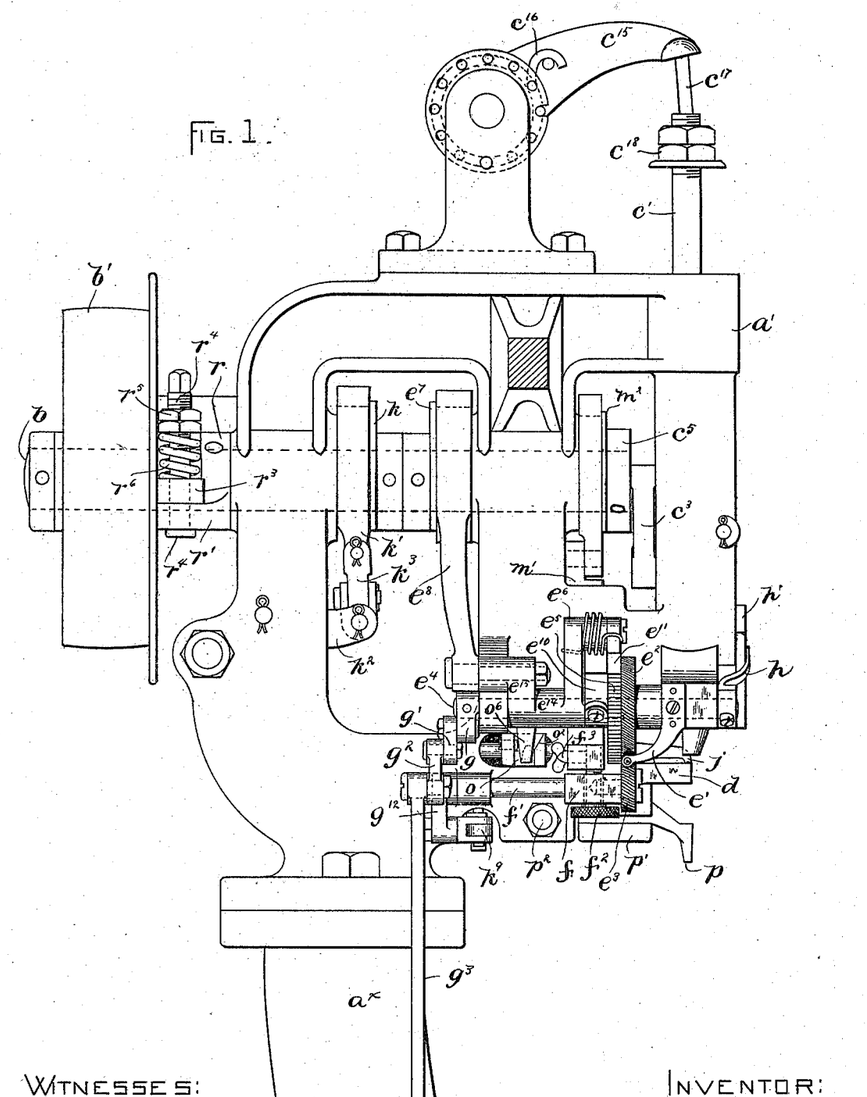
Figure 1 represents a side elevation from the left of the machine, the base portion of the standard being omitted, the wire-reel and a portion of the bracket being broken off.
Figures 3, 4:
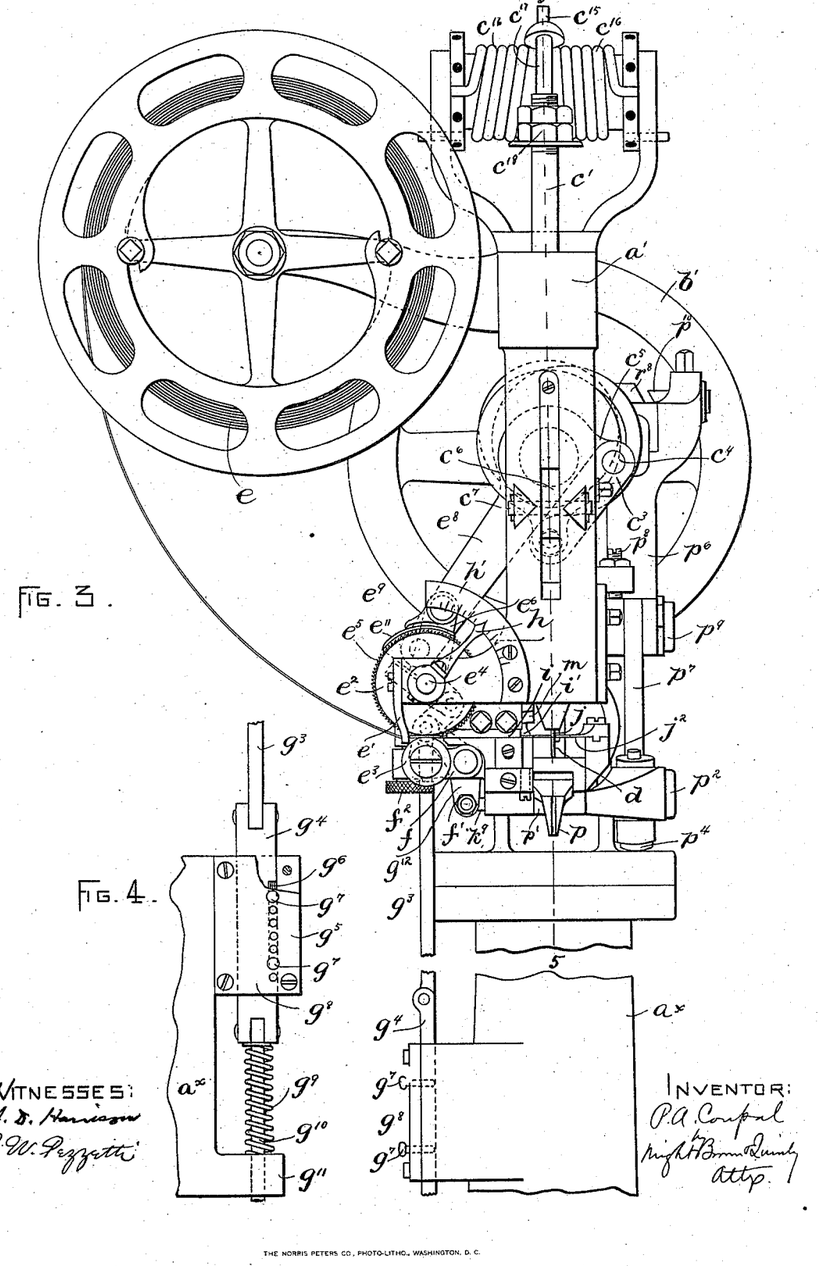
Fig. 3 represents a front elevation.
Fig. 4 is a detail elevation representing a portion of the mechanism for regulating the length of the staple formed.
Figures 11, 12:
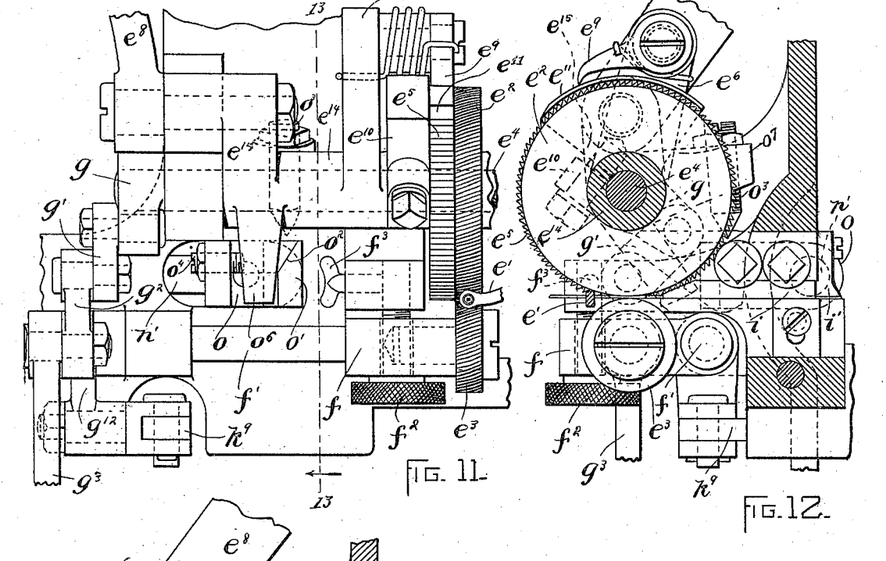
Fig. 11 represents a detail side elevation of the wire-feeding mechanism enlarged upon Fig. 1.
Fig. 12 represents a detail front elevation of the same.

Referring to Figs. 1 and 3, and particularly to Figs. 11 and 12, $e^{10}$ represents an arm secured to and projecting from the shaft $e^4$ and provided with a curved plate or shield $e^{11}$, which projects over a portion of the ratchet $e^5$ to limit the engagement of the pawl with the ratchet. Since the pawl is held toward the ratchet or the shield by spring-pressure, it will be readily understood that if a portion of the shield is interposed between a portion of the path of movement of the pawl and the ratchet it will restrict the operative throw of said pawl. The means by which this shield is moved to different positions will be hereinafter described.

The lower feed-roller $e^3$ is carried by an arm $f$, mounted on the front end of a pin $f'$, secured in the frame of the machine. (See Figs. 1, 11, and 12.) In order that this arm may be adjusted to vary the grip on the wire or to permit the passage of different sizes of wire, the said arm is provided with an adjusting-screw $f^2$, tapped through it and fitted to a threaded hole in the frame, a lock-screw $f^3$ being employed to hold the adjusting-screw in proper position.

The means for varying the size of the staple to be formed by altering the length of the piece of wire fed and cut off will now be described.

Figure 13:
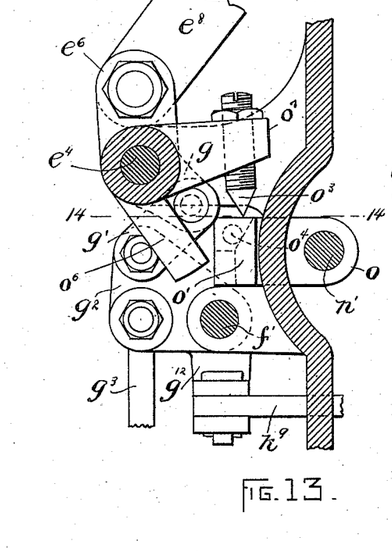
Fig. 13 represents a section on line 13 13 of Fig. 11, looking in the direction of the arrow.

Secured to the rear end of the shaft $e^4$, which operates the shield, is an arm $g$, connected, by means of a link $g'$, with a triangular arm $g^2$, having an extension $g^{12}$. (See Figs. 11, 12, and 13, particularly the latter.) This lever $g^2$ is pivotally supported on the rear end of the pin $f'$ and is swung on said pivot by means of a rod $g^3$, the lower end of which is connected to a slide $g^4$, fitted to slide in ways formed in a lug or projection $g^5$ from the lower part or base of the standard $a^\times$. In one side of the slide $g^4$ is an elongated notch $g^6$, and in the face-plate $g^8$, which covers the slide, there are formed a series of holes adapted to receive stop-pins $g^7$. These stop-pins when in place restrict the freedom of movement of the slide $g^4$. As illustrated in Fig. 4, the two pins $g^7$ are so placed that the throw permitted for the slide $g^4$ is quite limited. By placing said pins nearer to each other a greater throw is permitted.

The lower end of the slide $g^4$ has connected to it the upper end of a rod $g^{10}$, which passes down through a lug $g^{11}$, projecting from the standard $a^\times$, and is connected with a suitable foot-treadle. (Not shown.) A spring $g^9$, surrounds the rod $g^{10}$ and is confined between the lower end of the slide $g^4$ and the upper surface of the lug $g^{11}$, said spring serving to hold the rod $g^3$ in elevated position. Since the vertical position of the rod $g^3$ controls the position of the shield $e^{11}$ through the connections above described, it will be understood that the pawl $e^9$ will engage more or less of the ratchet-teeth of the upper feed-wheel and feed more or less of the wire, according to the position of said slide $g^4$ and rod $g^3$. The arrangement of the stop-pins $g^7$ permits the cutting off of two alternative and certain lengths of wire by a simple operation of the treadle. Therefore when the operator wishes to change the size of staple to be driven into the particular shoe undergoing treatment he can control the size to be applied between these two limits, and by adjusting the stop-pins the minimum size of staple can be formed. Thus the size of the staple is under the control of the operator, regardless of the thickness of the work being operated upon, this being a decided advantage in the manufacture of some classes of goods.

To indicate to the eye of the operator the size of staple being formed, a pointer $h$ is secured on the front end of the shaft $e^4$ and indicates the said size on a segmental index-plate $h'$, secured to the frame or head of the machine. (See Fig. 3.)

I will now describe the means for severing the wire to form the blanks. The cutter $m$ (see Figs. 5 and 6) is reciprocated by mechanism to be described, adjacent to the inner end of a guide-block $i$, (see Figs. 3 and 6,) said guide-block being grooved on its under side to permit the passage of the wire from the feed-rolls. To prevent the blank after being severed by the cutter from being lifted by the said cutter as it rises, a top rest or stripper $i'$ is employed. The anvil, which is reciprocated by mechanism presently described, is provided with a gripper $j$ on its upper surface, said gripper being provided with a groove $j'$ to fit over the wire. This gripper is separated from the anvil by a narrow space, as indicated in Fig. 5, through which space the end of the wire is pushed by the feed-rolls, said wire passing along the side or in front of a thin guide or back-rest $j^2$, which is secured in place by means of a screw $j^3$, fitting a suitable lug in the frame of the machine. (See Figs. 5 and 7.) This back-rest is provided with a guide-block $j^4$, secured thereto, said block fitting a groove formed therefor in the side of the anvil and gripper, as shown in Fig. 5. This steadies the back-rest during the reciprocations of the anvil and gripper.

It is to be understood that when the end of the piece of wire has been pushed through the narrow space between the anvil and gripper the rearward movement of the latter serves to draw the end of the gripper up onto and over the wire, which is supported against the back-rest until the groove $j'$ of the gripper has engaged the wire. Then the cutter descends, severs the blank, and the anvil and gripper are advanced to the position shown in Fig. 5 by the mechanism presently described, after which the descent of the carrier and driver shapes and drives the staple, as hereinbefore described.

An eccentric $k$ on the main shaft $b$ has its strap $k'$ connected by means of a universal-joint link $k^3$ with the upper end of a bell-crank lever $k^2$, pivoted to the frame of the machine. The lower end of the lever $k^2$ is connected by means of a universal-joint link $k^4$ with the rear end of the arm $k^5$, the front end of which is connected to the sliding block $k^6$, which is adapted to reciprocate in a surface groove in the arm $k^7$, pivotally supported in the frame at $k^8$, said arm $k^7$ being connected by means of the rod $k^9$ (see Figs. 5 and 13) with the extension $g^{12}$ of the arm $g^2$. (See Figs. 11 and 13.) It will therefore be understood that when the adjustment previously described has been made, in order to vary the length of wire to be cut off from the blank there will be a corresponding adjustment or variation in the path of movement of the anvil $d$, said anvil being secured to the arm $k^5$ and to the block $k^6$, so as to reciprocate in line with the surface groove of the arm 17. Therefore when the longer blank is being used the anvil and gripper are adjusted so that they will take the blank at the center.

Preferably the gripper $j$ is pivotally connected with the anvil and provided with a spring to give the gripping action on the blank. As illustrated in Fig. 5, the gripper is provided with a side plate extending down over the side of the anvil and pivoted thereto, as at $l$, said gripper being provided with rearwardly-extending arm provided with a socket $l'$ to receive a spring $l^2$, which presses upon the upper surface of the arm $k^5$ and forces the outer end of the gripper $j$ down upon the anvil.

The cutter $m$ is secured to a block $m'$, fitted to slide vertically in suitable ways in the frame or head of the machine, said block being connected with the strap of an eccentric $m^2$ on the driving-shaft $b$. (See Fig. 5.)

Figure 14:
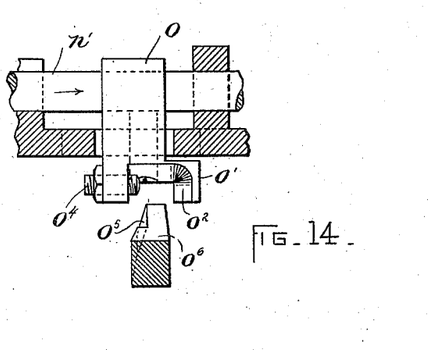
Fig. 14 represents a detail section on line 14 14 of Fig. 13.

Referring to Fig. 7, in which the shape of the end of the wire after it has been operated upon by the cutter is shown, the said end of the wire being indicated at $d^2$, it will be noticed that the extreme point of the wire is at one side of the center thereof. Therefore if the staple were to be formed with the lug in this shape it would have a tendency to move laterally when being driven into the work. It is therefore desirable to slightly bend the extreme end of the wire in order to bring it into a line with the center thereof. This is done by means of the point-bender $n$, (see Fig. 6,) which is carried at the end of a rod $n'$, provided with an adjustable collar $n^2$, a helical spring $n^3$ being confined between said collar and a stationary portion of the frame. The rearward position of the rod $n'$ is limited by means of the adjusting-screw $n^4$. The means for giving the rod $n'$ the slight positive longitudinal movement to bend the point of the wire are as follows: Secured to the rod $n'$ is a block $o$, (see Figs. 6, 13, and 14,) said block being provided with an offset $o'$, having an inclined surface $o^2$, adapted to be engaged by a screw $o^3$, carried by an arm $o^7$, projecting from the pawl-carrier or arm $e^6$. It will be understood that the downward movement of the tapered end of the screw $o^3$, engaging the inclined face $o^2$, will move the latter and the rod $n'$ in the direction indicated by the arrow in Fig. 14, thus communicating the necessary slight movement of the point-bender for the purpose described. Another arm $o^6$, projecting from the pawl-carrier, is provided with an inclined face $o^5$, adapted to engage the end of a screw $o^4$, carried by the block $o$, the object of this latter construction being to positively return the block on the point-bender in the direction opposite to the arrow shown in Fig. 14 in case the spring $n^3$ should fail to operate at the proper moment.

The work-rest $p$, provided with a vertical groove or passage-way for the staple, through which the latter is forced by the driver, is mounted on the end of the lever $p'$, pivoted at $p^2$ to the frame of the machine and permitted to have a short oscillation on its pivot. The limit of the downward movement of this lever is determined by means of an adjusting-screw $p^3$, passing through it and adapted to strike a suitable stop on the frame. Near the screw $p^3$ is a socket, open at the bottom to receive a plunger $p^4$, adapted to bear upon a suitable portion of the frame of the machine and pressed down by a spring $p^5$, surrounding the stem of the plunger. The rear end of the lever $p'$ is connected to an elbow-lever $p^6$ by means of a link $p^7$, the upper end of which is adapted to contact with an adjustable stop-screw $p^8$, which serves to limit the upward movement of the rear end of the lever $p'$ under the influence of the spring $p^5$. The elbow-lever $p^6$ is pivoted at $p^9$ and is provided at its upper end with a pin $p^{10}$, which projects into the path of movement of the clutch mechanism hereinafter described. (See Figs. 2, 20, and 21.)

The driving-pulley $b'$ is loose on the shaft and held thereon by a suitable collar $b^3$. Between the pulley and the frame of the machine is mounted the clutch. A collar $r$ is rigidly secured to the shaft and is provided with a lug $r'$. (See Figs. 1 and 20.) Adjacent to this collar $r$ is a sleeve $r^2$, provided with a lug $r^3$, projecting out over the lug $r'$ of the collar $r$. A bolt $r^4$ passes through the two lugs and extends above them and is provided with set-nuts $r^5$, between which and the lug $r^3$ is secured a spring $r^6$, surrounding the bolt. On the side opposite the lug $r^3$ the sleeve $r^2$ is provided with an extension $r^7$, to which there is pivoted on one side a movable block $r^8$, normally pressed outward by means of a spring-pressed pin $r^9$. On the other side of the extension $r^7$ is a fixed lug $r^{10}$.

Figure 2:
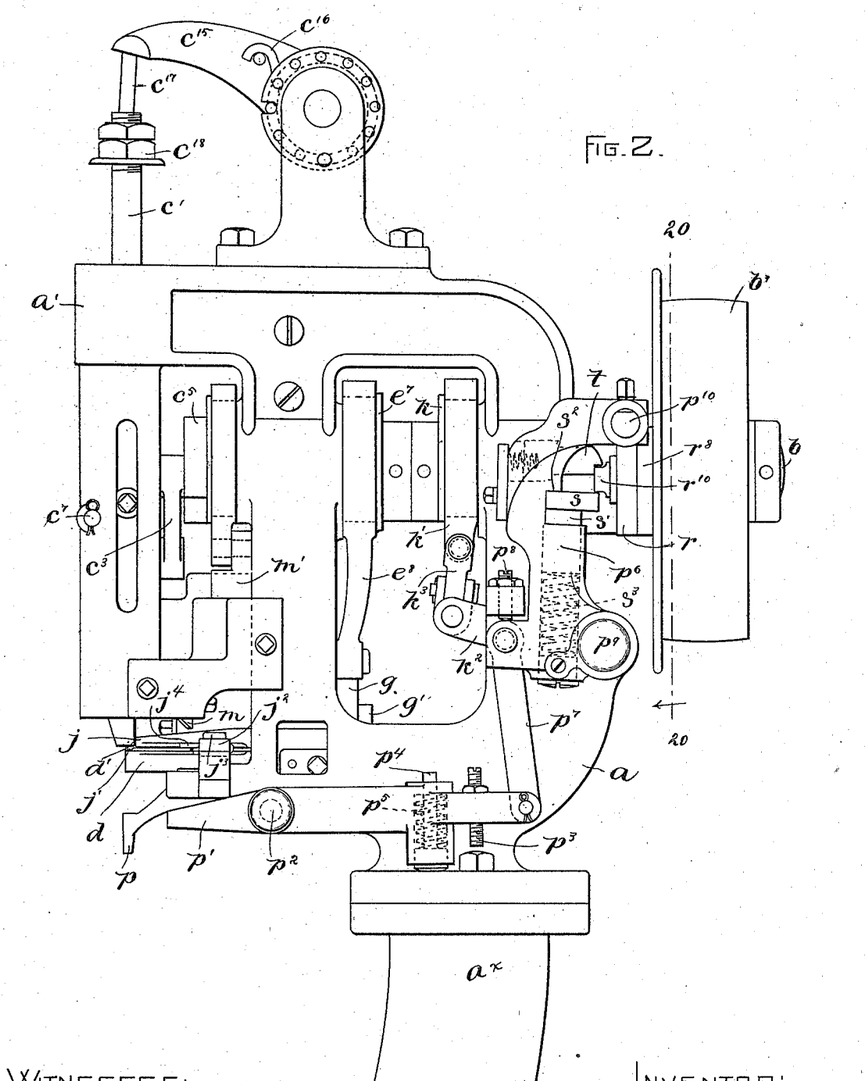
Fig. 2 represents a side elevation from the opposite side of the machine.

Referring to Fig. 2, it will be seen that the lever $p^6$ is provided with a stop $s$, carried at the upper end of a plunger $s'$ and held against a shoulder $s^2$ by means of a spring $s^3$, fitted to a recess in said lever below the plunger.

Figure 20:
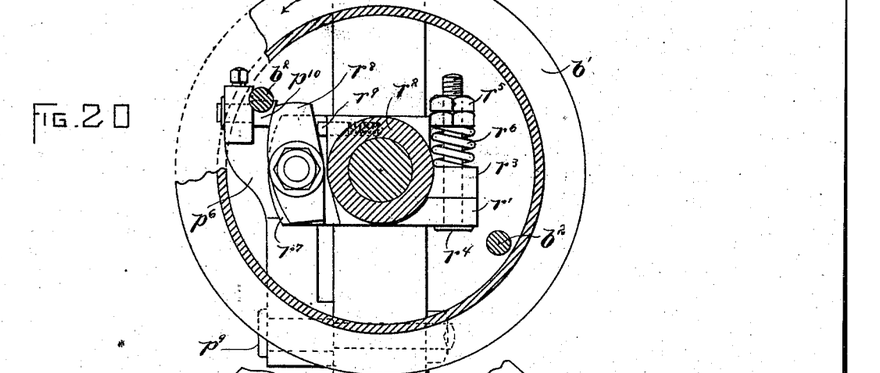
Fig. 20 represents a section on the line 20 20 of Fig. 2, looking in the direction of the arrow.
Figure 21:
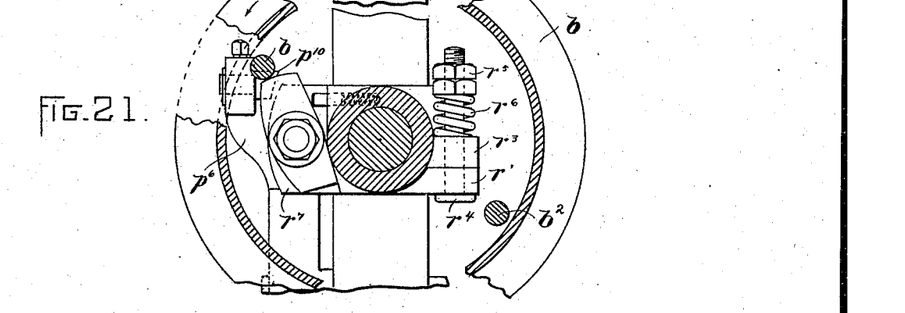
Fig. 21 is a similar view representing parts of the clutch mechanism in a different position.

Fig. 20 illustrates the position of the movable block $r^8$ of the clutch when the pulley is run free without operating the machine, the said movable block $r^8$ being out of the path of movement of either of the pins $b^2$ $b^2$, carried by the pulley. If now the work be pressed against the work-rest $p$, the rear end of the lever $p'$ will be moved downward, thus oscillating the lever $p^6$ on its pivot and withdrawing the pin $p^{10}$ from the front of the movable block $r^8$, it being understood in referring to Fig. 20 that the movement of said pin $p^{10}$ is in a direction away from the observer. As soon as the block $r^8$ has been thus released the pin $r^9$ moves it outward into the path of movement of one of the pins $b^2$, as shown in Fig. 21, said pin then striking the top of the block $r^8$ and rotating the shaft through the medium of the collar and sleeve construction heretofore described. The object of the spring $r^6$ is to relieve the shock due to the contact of the pulley-pin with the block $r^8$.

Figure 22:
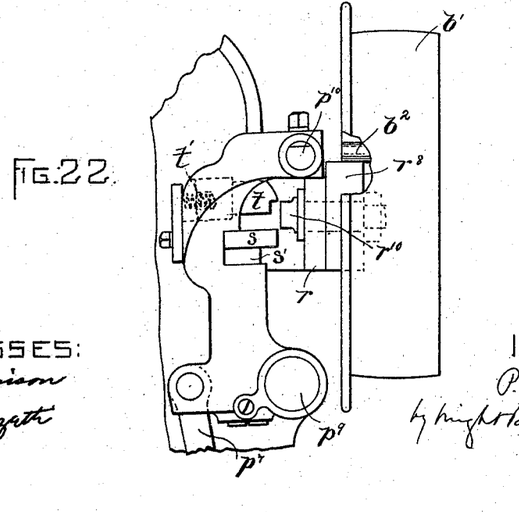
Fig. 22 is a detail side elevation of parts of the clutch mechanism.

The timing of the operation is such that when the pulley is disconnected from the shaft a previously-cut blank is gripped between the anvil and the gripper ready to be bent and driven as soon as the work is brought into position. Then the operation of the clutch is caused to connect the pulley with the shaft, as above described. When the pulley has given the clutch a single rotation, the block $r^8$ is brought against the pin $p^{10}$, and owing to the cam shape of the former is forced backward out of engagement with the pin $b^2$. At the same moment the fixed lug $r^{10}$ on the other side of the sleeve $r^2$ comes in contact with the slightly-yielding stop $s$, thus immediately stopping the movement of the operative parts. To prevent the rebounding so as to carry the lug $r^{10}$ away from the stop $s$, I provide a spring-latch $t$, (see Figs 2 and 22,) which is fitted to slide in a horizontal socket formed near the upper end of lever $p^6$, a spring $t'$ being provided to press said latch toward the lug $r^{10}$.

Figures 15, 16, 17, 18:
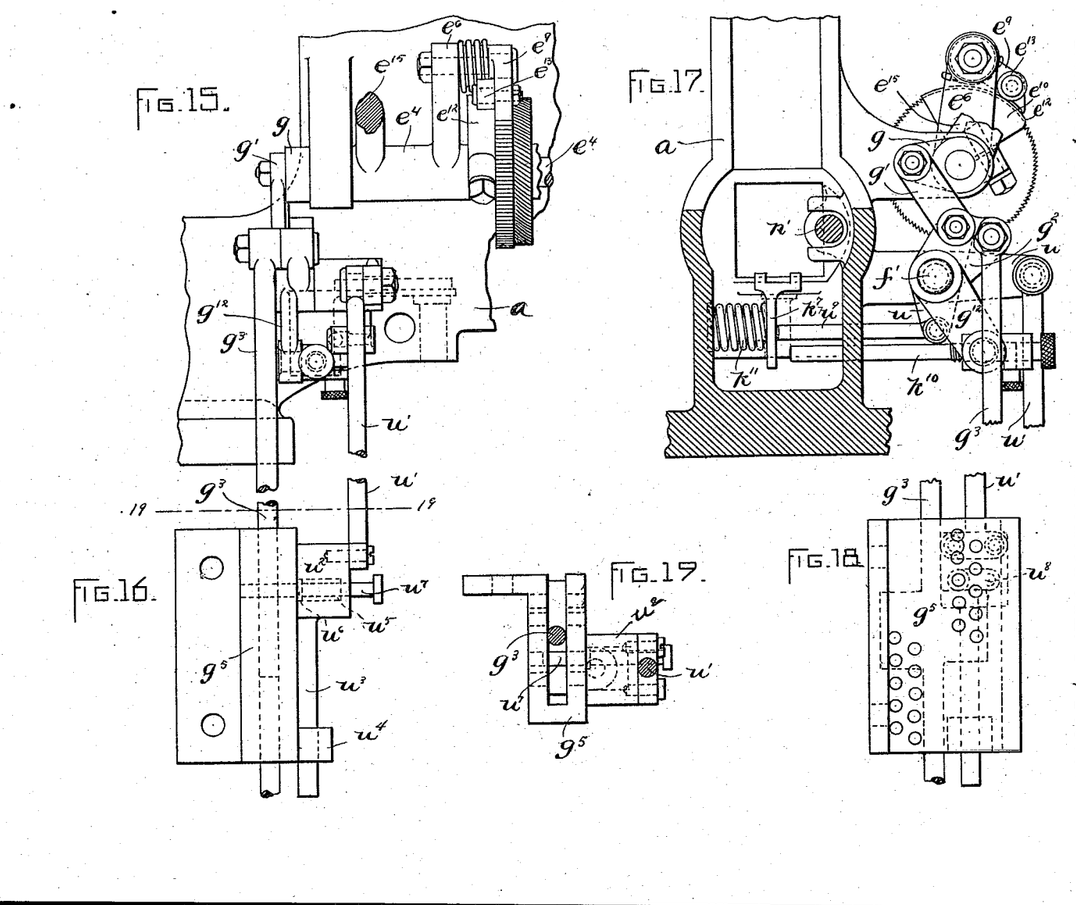
Fig. 15 is a view similar to Fig. 11, but showing a different form of mechanism, which is also the preferred form.
Fig. 16 represents a side elevation of the mechanism for regulating the position of the shield and controlling the length of feed of the wire, said figure being in reality a continuation downward of Fig. 15.
Fig. 17 represents an elevation from the left of Fig. 15.
Fig. 18 represents an elevation from the left of Fig. 16.

Referring to Figs. 15 to 19, inclusive, I will describe certain modified features of construction, which features I prefer. In Figs. 15 and 17 it will be seen that instead of providing a shield extending over the ratchet $e^5$ I form the arm $e^{10}$ with a raised surface $e^{12}$ at one side of the said ratchet, the pawl being provided with a roller $e^{13}$, adapted to ride over said surface $e^{12}$. This avoids the wear and friction of a pawl dragging over the surface of the shield. These views, Figs. 15 to 19, inclusive, also illustrate a preferred form of details of mechanism by means of which I am enabled to adjust a particular minimum length of the blank to be cut off to form the staple, while still leaving the treadle-operating mechanism free to instantly alter the length of staple to a given maximum. In said figures such parts as are the same or substantially the same as the elements already described above the same reference-characters are employed.

In Fig. 17 I show a pin or rod $k^{10}$, which takes the place of the rod $k^9$, which has been described as reciprocated by the extension $g^{12}$ of the arm $g^2$.

In Figs. 16, 19, and 18, particularly the latter, it will be seen that the rod $g^3$ is provided with a lug on each side, (indicated by dotted lines,) which lugs are adapted to be engaged by stop-pins $g^7$, inserted through holes in the face-plate, the holes being above the lug on one side and below the lug on the other side instead of projecting into a notch, as shown in Fig. 4.

In Fig. 17, $u$ represents an elbow-lever pivoted on the end of the pin $f'$ and having a rod $u'$ at its outer end, the lower end of which is connected to the block $u^2$, provided with a stem $u^3$, guided in a boss $u^4$. (See Fig. 16.) In the block $u^2$ is a recess $u^5$ to permit the play of a collar $u^6$ on a pin $u^7$, which is adapted to be moved laterally in a slot $u^8$, so that said pin can be set in either one of said holes in the projection $g^5$, thus permanently holding the lever $u$ in the position to which it is thus adjusted. The other end of the lever $u$ is pivoted to a rod $u^9$, which extends through the frame and forms a stop or abutment for the arm $k^7$. Since the arm $k^7$ vibrates on the center $k^8$ and causes the direction of reciprocation of the anvil to be changed so as to come in the center of the blank that is fed, it will be readily understood that the position of the rod $u^9$ controls one limit of position of the arm $k^7$. In practice the connections are such that this is the limit of the smallest or shortest staple to be formed, and by adjusting the pin $u^7$, as above described, the position of the stop-pin $u^9$ is altered.

When the rod $g^3$ is moved downward, it operates, through the link $g'$, an arm $g$ to operate the adjustment of the feed, as heretofore described, and at the same time, by means of extension $g^{12}$, causes the rod $k^{10}$ to oscillate the arm $k^7$ away from the rod $u^9$ and alter the position of the anvil to bring it under the center of the longer blank fed.

A brief general description of the operation having been given, and also descriptions of the operations of the details of the mechanism, further reference to the operation is unnecessary.

It will be seen that all of the operating parts of the machine are driven from the shaft $b$, through the medium of eccentrics $e^7$, $k$, and $m^2$, and the wrist-pin $c^4$, thus entirely avoiding the use of any cam construction whatever. This is an advantage, owing to the fact of the increase and durability of the parts, as will be well understood.

I claim—

1. A machine for driving metallic fastenings, comprising in its construction a spring-operated driver, a detent or latch for holding the driver with its spring compressed, a movable work-rest, and means placed in action by pressure of the work against said rest to trip said latch to release the driver, and then restore the driver to its first position, the action of said means being continuous until the work is removed from the rest.

2. A machine for driving metallic fastenings, comprising in its construction a vertically-movable driver, a spring for depressing the driver, means for raising the driver, a detent or latch for holding the driver when so raised, a movable work-rest, and means placed in action by pressure of the work against said rest to trip said latch to release the driver, and then restore the driver to its first position, the action of said means being continuous until the work is removed from the rest.

3. A machine for making and driving staples, comprising in its construction staple-forming mechanism, a spring-operated driver, a detent or latch for holding the driver with its spring compressed, a movable work-rest having a throat for the passage of the staples, and means placed in action by pressure of the work against said rest to trip said latch to release the driver, and then restore the driver to its first position, the action of said means being continuous until the work is removed from the rest.

4. A machine for driving metallic fastenings, comprising in its construction a spring-operated driver, a carrier for guiding and raising the driver, a detent or latch for holding the driver when so raised, and a cam or striker carried by said carrier for automatically moving said latch to release the driver.

5. A machine for driving metallic fastenings, comprising in its construction a spring-operated driver having its bar provided with a shoulder, a carrier for elevating said bar, a latch to engage said shoulder, and cams or strikers carried by said carrier for automatically moving said latch out of and into engagement with said shoulder.

6. A machine for making and driving staples, comprising in its construction wire-feeding mechanism, a driver, an anvil, means for adjusting the length of wire fed for forming the staple, said means permitting varying lengths to be given, independent means under the control of the operator for instantly changing the length of feed from one limit to the other, and connections between the wire-feed adjustment and the anvil whereby the anvil will take the wire blank at the center.

7. In a machine of the character specified, the combination with the driving-shaft $b$, of the carrier $c^2$, a wrist-pin and pitman connecting the shaft and carrier, the spring-depressed driver and its bar, the latch $c^6$ for engaging said bar, and means connected with said carrier for automatically disengaging the latch from the driver-bar.

8. In a machine of the character specified, the combination with the driving-shaft $b$, of the carrier $c^2$, a wrist-pin and pitman connecting the shaft and carrier, the spring-depressed driver and its bar, the latter having an opening forming a shoulder $c^9$, the latch $c^6$ pivoted to a stationary part of the machine, and means connected with said carrier for automatically oscillating said latch on its pivot.

9. In a machine of the character specified, the combination with the carrier $c^2$ having the cam-shaped striking-surfaces $c^{10} c^{12}$, of means for reciprocating the carrier, the spring-depressed driver and its bar fitted to said carrier, and the latch $c^6$ having faces $c^{13} c^{14}$ adapted to be alternately engaged by said striking-surfaces.

10. In a machine of the character specified, the combination with the carrier $c^2$ having its lower end slotted to form bending-jaws $d' d'$, of the anvil $d$ over which a wire blank is bent by said jaws, means for feeding blanks into position to be bent, the driver $c'$ having the groove $c^{11}$ and the shoulder $c^9$, the latch $c^6$, and means for reciprocating the said carrier and driver.

11. In a machine of the character specified, the combination with the reciprocating anvil and its gripper $j$, of the guide or back-rest $j^2$, means for feeding wire in front of said rest, and a cutter for severing the wire to form a blank.

12. In a machine of the character specified, the combination with wire-feeding mechanism and means under the control of the operator and independent of the thickness of the work for adjusting the length of feed, both as to two limits of size and to varying degrees within said limits, of a cutter for severing the wire to form the blank, an anvil, bending-jaws, and connections whereby the position of the anvil is adjusted to correspond with adjustments of the feed, for the purpose described.

13. In a machine of the character specified, the combination with wire-feeding mechanism, and means under the control of the operator and independent of the thickness of the work for adjusting the length of feed, both as to two limits of size and to varying degrees within said limits, of a cutter for severing the wire to form the blank, a reciprocating anvil and gripper to take the blank, a guide for said anvil, and means for adjusting said guide according to the adjustment of the feed.

14. In a machine of the character specified, the combination with wire-feeding mechanism and means for adjusting the length of feed, of a cutter for severing the wire to form the blank, a reciprocating anvil and gripper to take the blank, a guide for said anvil, means for adjusting said guide according to the adjustment of the feed, a stop for limiting the movement of the guide in one direction, and means under the control of the operator for limiting the movement of the guide in the other direction.

15. In a machine of the character specified, the combination with wire-feeding mechanism and means for adjusting the length of feed, of a cutter for severing the wire to form the blank, a reciprocating anvil and gripper to take the blank, a guide for said anvil, means for adjusting said guide according to the adjustment of the feed, a stop for limiting the movement of the guide in one direction, stop mechanism under the control of the operator for limiting the movement of the guide in the other direction, and means for adjusting said stop mechanism.

16. In a machine of the character specified, the combination with the anvil $d$, of the gripper $j$ pivoted thereto and provided with the rearward extension having a socket, and the spring $l^2$ in said socket and bearing on the rear arm of the anvil.

17. In a machine of the character specified, the combination with wire-feeding mechanism and a cutter adapted to sever the wire at an acute angle, the bender $n$ having a longitudinally-movable rod $n'$, the spring $n^3$ for moving the rod in one direction, the back-stop $n^4$, and means for moving the rod against the action of the spring.

18. In a machine of the character specified, the combination with the rod $n'$ and its point-bender $n$, of the spring $n^3$, the block $o$ secured to the rod and having the inclined surface $o^2$, and the oscillating arm having the screw $o^3$ to engage said surface $o^2$.

19. In a machine of the character specified, the combination with the lever $p'$ and its throat-rest $p$, of the lever $p^6$ having the pin $p^{10}$ and connected to said lever $p'$, the shaft $b$ and pulley $b'$, clutch mechanism for operatively connecting the pulley with the shaft and adapted to be brought into action by the removal of the pin $p^{10}$ from the path of movement of a part of the clutch, the lug $r^{10}$ carried by the clutch, and the yielding stop $s$ to receive the impact of said lug.

In testimony whereof I have signed my name to this specification, in the presence of two subscribing witnesses, this 19th day of May, A. D. 1896.

PETER A. COUPAL.

Witnesses:
C. F. BROWN,
A. D. HARRISON.